United States Patent Office 2,998,446
Patented Aug. 29, 1961

2,998,446
PRODUCTION OF CARBOXYLIC ACIDS
AND ESTERS
Amelio E. Montagna, South Charleston, W. Va., Donald G. Kubler, Columbia, S.C., and Julius J. Brezinski, St. Albans, W. Va., assignors to Union Carbide Corporation, a corporation of New York
No Drawing. Filed Feb. 5, 1959, Ser. No. 791,269
15 Claims. (Cl. 260—484)

The present invention relates to processes for producing organic compounds, and is especially concerned with improved processes for the production of hydroxy-substituted saturated aliphatic carboxylic acids and carboxylic acid esters.

More particularly, the carboxylic acids and carboxylic acid esters produced in accordance with the processes of this invention are known to the art, and can be represented by the general formula:

I

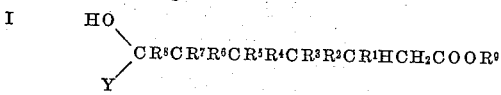

wherein each $R^1$ to $R^8$ respectively designates a member of the class consisting of hydrogen and the lower alkyl radicals containing from 1 to about 4 carbon atoms; $R^9$ designates a member of the class consisting of hydrogen and the alkyl radicals containing from 1 to about 18 carbon atoms; Y designates a member of the class consisting of hydrogen, the lower alkyl radicals containing from 1 to about 4 carbon atoms, the carbalkoxy radicals containing from 2 to about 19 carbon atoms and the carboxy radical; and wherein when Y designates a carbalkoxy radical, $R^9$ designates an alkyl radical and when Y designates the carboxy radical, $R^9$ designates hydrogen. By way of illustration, each $R^1$ to $R^8$ respectively can be hydrogen or a methyl, ethyl, propyl, isopropyl, butyl or isobutyl radical, and the like; $R^9$ can be hydrogen or a methyl, ethyl, isopropyl, butyl, hexyl, 2-ethylhexyl, decyl, tetradecyl or octadecyl radical, and the like; and Y can be hydrogen or a methyl, ethyl, propyl, isopropyl, butyl, isobutyl, carbomethoxy, carbethoxy, carbobutoxy, carbohexoxy, carb-2-ethylhexoxy, carbodecyloxy, carbotetradecyloxy, carboctadecyloxy or carboxy radical, and the like. Thus, when Y designates either hydrogen or an alkyl radical, the products of this invention are derivatives of and include 7-hydroxyheptanoic acids; and when Y designates either a carbalkoxy or carboxy radical, the products of this invention are derivatives of and include 2-hydroxyoctanedioic acids.

In the broadest aspect, the processes of this invention contemplate the production of the carboxylic acids and carboxylic acid esters described herein from starting materials comprising polymeric ester compositions formed substantially of recurring units represented by the general formula:

II

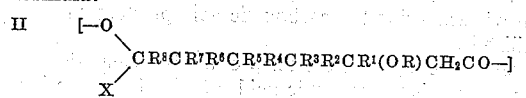

wherein R designates an alkyl radical containing from 1 to about 18 carbon atoms, $R^1$ to $R^8$ are as defined above and X designates a member of the class consisting of hydrogen, the lower alkyl radicals containing from 1 to about 4 carbon atoms and the carbalkoxy radicals containing from 2 to about 9 carbon atoms. As provided by the invention, these polymeric ester compositions are subjected to either saponification or to transesterification, each process being accompanied by the simultaneous hydrogenation of the reaction mixture, depending upon whether a carboxylic acid or carboxylic acid ester product is desired. In addition, the carboxylic acid esters of this invention can also be prepared from the corresponding carboxylic acids by direct esterification.

The polymeric ester compositions found suitable for use as starting materials in the processes of this invention are obtained in accordance with the processes described in copending application Serial No. 517,074, filed June 21, 1955, now issued as United States Patent No. 2,876,239. More specifically, the polymeric ester compositions are produced by reacting ketene with a 2-alkoxytetrahydropyran or substituted 2-alkoxytetrahydropyran represented by the general formula:

III

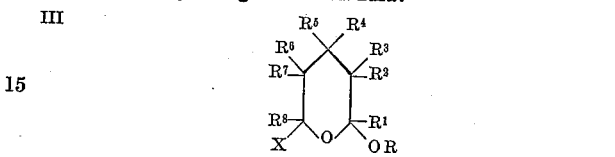

wherein R, $R^1$ to $R^8$ and X are as defined above, at a reaction temperature within the range of from —80° C. to 100° C. and in the presence of an acidic catalyst. The polymeric ester compositions are recovered as thick liquid products having viscosities of about 1,000 centistokes or higher at a temperature of 100° C. and molecular weights of from about 325 to about 3,000 and higher, and can subsequently be employed as herein described for the production of the carboxylic acids and carboxylic acid esters of this invention.

Illustrative of the broad range of polymeric ester compositions found useful as starting materials in the processes of this invention there can be mentioned the following, although others can also be employed:

Polymeric esters of:
3-ethoxy-7-hydroxyheptanoic acid,
3-methoxy-7-hydroxyheptanoic acid,
3-[2-ethylhexoxy]-7-hydroxyheptanoic acid,
3-ethoxy-4-ethyl-5-methyl-7-hydroxyheptanoic acid,
3-ethoxy-5-methyl-7-hydroxyheptanoic acid,
3-ethoxy-6-butyl-7-hydroxyheptanoic acid,
3-butoxy-3-methyl-7-hydroxyheptanoic acid,
3-ethoxy-5-methyl-7-hydroxyheptanoic acid,
3-ethoxy-6-butyl-7-hydroxyheptanoic acid,
3-butoxy-3-methyl-7-hydroxyheptanoic acid,
3-butoxy-5-propyl-7-hydroxyheptanoic acid,
3-[2-ethylhexoxy]-5-isopropyl - 7 - hydroxyheptanoic acid,
3-ethoxy-4,6-diethyl-5-propyl - 7 - hydroxyheptanoic acid,
3-ethoxy-7-methyl-7-hydroxyheptanoic acid,
3-ethoxy-7-carbethoxy-7-hydroxyheptanoic acid,
3-butoxy-7-carbobutoxy-7-hydroxyheptanoic acid,
3-butoxy-4,7-dimethyl-7-carbobutoxy - 7 - hydroxyheptanoic acid,
3-[2-ethylhexoxy]-4,7-dimethyl - 7 - [carb-2-ethylhexoxy]-7-hydroxyheptanoic acid, and the like.

In an embodiment of the invention, when a carboxylic acid product is desired, the polymeric ester composition is suitably admixed with both an alkaline saponification agent and a catalytic amount of a hydrogenation catalyst, preferably in the presence of an amount of water sufficient to dissolve the saponification agent and to keep the subsequently resulting product in solution. If desired, an inert solvent for the polymeric ester composition, such as diethylene glycol dimethyl ether, other lower alkyl diethers of ethylene glycol and diethylene glycol, and the like can also be utilized. The reaction mixture is then hydrogenated. In this manner, the polymeric ester composition undergoes dealkoxylation and is converted to a monomeric alkaline salt of a hydroxy-substituted saturated aliphatic carboxylic acid. Recovery of the desired carboxylic acid product is thereafter accomplished through the acidification of the alkaline reaction mixture, followed by the extraction of the carboxylic acid from the acidified mixture with a suitable organic solvent or by separation therefrom in any other convenient manner.

It is to be noted that the dealkoxylation step is also accompanied by the formation of alcohol represented by the general formula ROH, wherein R designates an alkyl radical as defined above. In addition, further quantities of alcohol are produced upon the saponification of polymeric ester compositions represented above by Formula II, wherein X designates a carbalkoxy radical. The formation of such alcohol has not been found to interfere with the process of the invention.

Of the alkaline saponification agents, an aqueous alkali metal hydroxide solution, such as an aqueous solution of sodium hydroxide, potassium hydroxide or lithium hydroxide, engenders particularly efficient results in accordance with the invention, although other alkaline saponification agents can also be utilized. Moreover, as the reaction is generally carried out in an aqueous medium, the use of a water-soluble alkaline saponification agent is preferred.

The reaction ordinarily employs about one equivalent of the saponification agent for each ester linkage present in the polymeric ester composition undergoing reaction. For example, the saponification of polymeric ester compositions represented above by Formula II, wherein X designates a substituent other than a carbalkoxy radical, involves the use of about one equivalent of saponification agent for each recurring unit of the polymeric ester composition; and when X designates a carbalkoxy radical, about 2 equivalents of the saponification agent for each recurring unit of the polymeric composition are employed. It has been observed that each ester linkage present in the polymeric ester composition is capable of undergoing saponification and can subsequently be acidified to a carboxylic acid function. Thus, when X designates a carbalkoxy radical, a dicarboxylic acid as represented above by Formula I, where $R^9$ designates hydrogen and Y designates a carbbox radical, is ultimately produced. In addition, it has been found preferable during the reaction to have a slight excess of the saponification agent present, e.g., about a 5 percent excess by weight, in order to insure a more complete saponification. Little commensurate advantage, however, can be expected by the use of a further excess of the saponification agent, while the use of lesser quantities than those indicated above ordinarily results in the realization of diminished product yields or products containing incompletely saponified products.

Of the hydrogenation catalysts which can be employed in the invention, best results have been obtained utilizing a Raney nickel catalyst, due to the high catalytic activity generally exhibited thereby under alkaline reaction conditions. The choice of hydrogenaiton catalyst is not critical to the invention, however. Hence, other conventional hydrogenation catalysts known to be operative under alkaline reaction conditions, such as charcoal-supported platinum or palladium, and the like, can also be used with satisfaction.

The concentration of hydrogenation catalyst to be incorporated in the reaction mixture is not narrowly limited. For example, catalyst concentrations of from about 1 percent up to about 25 percent based upon the weight of the polymeric ester composition or higher can be employed efficiently, with concentrations of from about 3 percent up to about 10 percent by weight of the polymeric ester composition being preferred. Within the operable range of catalyst concentration, a proportional increase in the rate of hydrogenation with increasing catalyst concentrations has been observed. At catalyst concentrations below about 1 percent by weight of the polymeric ester composition, however, little catalytic effect may be expected, while the advantage of an increased reaction rate is not commensurate with the use of catalyst concentrations in excess of about 25 percent by weight of the polymeric ester composition.

In accordance with the invention, the hydrogenation of the reaction mixture containing the polymeric ester composition, saponification agent and hydrogenation catalyst is carried out in a suitable reactor such as hydrogenation autoclave, at a temperature preferably within the range of from about 125° C. up to about 175° C. or slightly higher, and under an initial positive hydrogen pressure of from about 150 p.s.i.g. up to about 2,500 p.s.i.g. or higher. More preferably, a reaction temperature of from about 135° C. up to about 165° C. and an initial hydrogen pressure of from about 500 p.s.i.g., and especially from about 1,200 p.s.i.g., up to about 1,800 p.s.i.g. are employed. The maximum operable temperature and hydrogen pressure is determined to a large extent by the temperature and hydrogen pressure at which excessive decomposition or undesirable side reactions occur. On the other hand, reaction temperatures below those hereinabove described at best effect slow rates of reaction and thus may not engender a substantial yield of the desired product within an efficient period of operation.

Upon completion of the hydrogenation, as determined for example by the attainment of constant pressure within the reactor, thus indicating a cessation of hydrogen absorption, the reaction mixture is ordinarily filtered to remove the hydrogenation catalyst and stripped of the alcohol formed during the course of reaction. The remaining alkaline carboxylic acid salt is then acidified, preferably by reaction with a mineral acid such as sulfuric, hydrochloric or phosphoric acid, thereby converting the carboxylic acid salt to the corresponding carboxylic acid.

The acid employed in the acidification is preferably introduced to the reaction mixture in dilute aqueous solution and admixed therewith in an amount of acid approximately equivalent to the amount of saponification agent previously utilized. A slight excess of the acid, e.g., about a 5 percent excess by weight, is usually employed in order to insure the complete neutralization of the saponification agent. The introduction of acid can be effected at a temperature of between about 0° C. and 100° C., with particularly efficient results being obtained by maintaining the temperature of the reaction mixture in the range of between 15° C. and 50° C. during the acidification. The desired carboxylic acid product can then be recovered from the acidified mixture, for example, by extraction with a suitable organic solvent such as diethyl ether, diisopropyl ether, methyl isobutyl ketone, and the like, followed by the removal of the extracting solvent and by the crystallization of the acid from a suitable solvent or solvent combination, such as an ether-ligroin solution. Any water that is present is generally removed following the initial extraction, as for instance, through the use of an inert drying agent such as anhydrous magnesium sulfate or sodium sulfate, or by distillating off the water as an azeotrope with the extracting solvent at low temperatures of up to about 35° C., and under reduced pressures. Other convenient means of recovering the carboxylic acid product can also be utilized.

When a carboxylic acid ester product is instead desired, the corresponding carboxylic acid, obtained as described above, can be subjected to direct esterification. The direct esterification is carried out by admixing the carboxylic acid with an alkyl alcohol and refluxing the reaction mixture at a temperature up to about 120° C., or higher, preferably in the presence of a catalytic amount of an acidic direct esterification catalyst, while removing the water of esterification formed during the course of reaction. It is also frequently desirable to incorporate in the reaction mixture an entrainer such as benzene, diisopropyl ether or the like, to assist both in the removal of the water of esterification, and in the control of the reaction temperature. Atmospheric pressure is generally employed for the reaction although higher or lower pressures can also be utilized.

The alkyl alcohols found suitable for use in the direct esterification include those containing from 1 to about 18 carbon atoms and particularly from 1 to about 8 carbon atoms. Typical of the alcohols which can be employed in the direct esterification there can be mentioned methanol, ethanol, n-propanol, 2-propanol, n-butanol, isobutanol, 2-ethylhexanol, decanol, tetradecanol, octadecanol and the like, although other alkyl alcohols can also be employed.

The alcohol reactant is preferably admixed with the carboxylic acid in an amount at least equal to the stoichiometric amount required for the direct esterification. Thus, with a monocarboxylic acid, at least one mol of alcohol per mol of acid is preferably employed, while a dicarboxylic acid is preferably reacted with at least 2 mols of alcohol per mol of acid. In particular, it has been found desirable to incorporate the alcohol in the reaction mixture in about a 5 to about a 10 mol excess of the stoichiometric amount required for reaction. The excess alcohol serves both as a solvent for the carboxylic acid and to limit any polymerization which may occur due to the presence of the hydroxyl substituent on the carboxylic acid ester product. Higher conversions to the desired carboxylic acid ester product are therefore possible. Less than stoichiometric quantities of alkyl alcohol can also be utilized in the direct esterification, accompanied, however, by the formation of decreased product yields.

When the use of a direct esterification catalyst is desired, a mineral acid catalyst such as sulfuric acid is preferably employed although any other acidic direct esterification catalyst can also be utilized. Especially good results can be obtained in this respect when the catalyst is present in the reaction mixture in a concentration of from about 0.1 up to about 0.5 percent by weight of the reactants, with catalyst concentrations of from about 0.05 up to about 1.0 percent by weight of the reactants and higher also permitting satisfactory conversions to the desired carboxylic acid ester product.

Upon completion of the direct esterification, the acidic catalyst is neutralized by the addition of an alkaline compound such as sodium ethoxide, the hydroxide or carbonate of either sodium or potassium, or the like. The carboxylic ester product can thereafter be recovered from the reaction mixture by distillation or in any other suitable manner.

Advantageously, a more direct and convenient process for the production of the carboxylic acid esters of this invention has been found to lie in the transesterification and hydrogenation of the polymeric ester compositions represented above by Formula II. Accordingly, the polymeric ester composition is suitably admixed with an alkyl alcohol and catalytic amounts of both a basic transesterification catalyst and a hydrogenation catalyst. The reaction mixture is then hydrogenated as hereinbelow described. In this manner, the polymeric ester composition undergoes dealkoxylation and is converted to a monomeric hydroxy-substituted saturated aliphatic carboxylic acid ester. Anhydrous conditions are generally maintained during this procedure. Recovery of the desired carboxylic acid ester can then be effected by the neutralization of the basic catalyst followed by the distillation of the neutralized reaction mixture or by separation therefrom in any other convenient manner.

The alkyl alcohols found suitable for use in the reaction are the same as those described above in connection with the direct esterification process. In addition, the alcohol reactant is preferably one possessing the same alkyl radical as that contained in the alkoxy substituent of the polymeric ester composition undergoing reaction and therefore identical with the alcohol produced during the dealkoxylation of the polymeric ester composition. Thus, the production of mixed carboxylic acid ester products containing more than one type of ester linkage is precluded.

The alcohol reactant is ordinarily admixed with the polymeric ester composition in an amount at least equal to the stoichiometric amount required for reaction. For example, the transesterification of polymeric ester compositions represented above by Formula II, wherein X designates a substituent other than a carbalkoxy radical, involves the use of at least one mol of alcohol for each recurring unit of the polymeric ester composition; and when X designates a carbalkoxy radical which is also capable of undergoing transesterification, at least two mols of alcohol for each recurring unit of the polymeric ester composition are employed. In addition, it has been found desirable to incorporate the alcohol in the reaction mixture in a substantial excess of the stoichiometric amount required for reaction, viz. in a proportion of up to about 15 moles of alcohol per each recurring unit of the polymeric ester composition, and preferably in a proportion of from about 3 to about 10 mols of alcohol per each recurring unit of the polymeric ester composition. The excess alcohol serves both as a solvent for the polymeric ester composition and to limit any polymerization which may occur due to the presence of the hydroxyl substituent on the carboxylic acid ester product. Higher conversions to the desired carboxylic acid ester product are therefore possible. Less than stoichiometric amounts of alcohol can also be utilized, resulting, however, in the recovery of diminished product yields or incompletely transesterified products.

While any basic transesterification catalyst can be employed in accordance with the invention, particularly efficient results can be achieved using the alkoxides of either alkali metals or alkaline earth metals, such as the alkoxides of sodium, lithium, potassium or calcium, etc., as the transesterification catalyst. Moreover, for similar reasons to that described above in connection with the selection of the alcohol reactant, the catalyst is preferably selected from among those in which the alkyl radical is the same as that contained in the alkoxy substituent of the polymeric ester composition undergoing reaction. It is to be noted in this respect that the transesterification catalyst can, if desired, be prepared in situ by the reaction of either an alkali metal or an alkaline earth metal with an alkyl alcohol.

The concentration of transesterification catalyst to be employed is not narrowly limited. Thus, for example, catalyst concentrations of from about 0.1 to about 2.0 percent and higher by weight of the polymeric ester composition can be utilized, with concentrations of from about 0.5 to about 1.0 percent by weight of the polymeric ester composition being preferred. Little catalytic effect may be expected, however, by the use of a transesterification catalyst in a concentration of less than about 0.1 percent by weight of the polymeric ester composition, while the advantage of increased catalytic activity is not commensurate with the use of catalyst concentrations in excess of about 2.0 percent by weight of the polymeric ester composition.

With respect to the hydrogenation catalyst, both composition and the concentration of catalyst to be used in the reaction are the same as those described above in connection with the production of the carboxylic acids of the invention.

The hydrogenation of the reaction mixture containing the polymeric ester composition, alkyl alcohol, transesterification catalyst and hydrogenation catalyst is carried out essentially as described above in connection with the production of the carboxylic acids of the invention, at a temperature within the range of from about 150° C. up to about 200° C. or slightly higher, and under an initial positive hydrogen pressure of from about 150 p.s.i.g. up to about 2,500 p.s.i.g. More preferably, a reaction temperature of from about 175° C. up to about 200° C. and an initial hydrogen pressure of from about 500 p.s.i.g., and especially from about 1200 p.s.i.g., up to about 1800 p.s.i.g. are employed. As in the production of the carboxylic acids, the maximum operable temperature and pressure for the reaction is generally determined by the temperature and pressure at which excessive decomposition or undesirable side reactions occur. At temperatures above about 200° C. and at hydrogen pressures above about 2,500 p.s.i.g., for example, some hydrogenolysis of the ester bonds may occur, thus diminishing the yield of the desired product. On the other hand, reaction temperatures and hydrogen pressures below those hereinabove described at best effect slow rates of reaction and therefore may not engender a substantial yield of the desired product within an efficient period of operation.

Upon completion of the hydrogenation, the reaction mixture is preferably filtered to remove the hydrogenation catalyst and stripped of alcohol by distillation at temperatures desirably kept below about 75° C. The basic transesterification catalyst is then generally neutralized prior to the recovery of the carboxylic acid ester product. The neutralization can be effected, for example, by washing a water-immiscible solution of the product containing the transesterification catalyst, e.g., a diethyl ether solution, with a dilute aqueous mineral acid such as dilute aqueous solution of hydrochloric, sulfuric or phosphoric acid. Following neutralization in this manner, the crude product is washed with water to remove any excess mineral acid, dried either by distilling off the water as an azeotrope with at least part of the solvent that is present or over a suitable inert drying agent such as anhydrous magnesium sulfate or sodium sulfate, and subsequently stripped of remaining solvent. The desired carboxylic acid ester product can thereafter be separated by fractional distillation, preferably under reduced pressure. Other convenient means of recovery can also be utilized.

The processes of the invention can be illustrated further in connection with the following specific examples of its practice.

*Example 1*

To 651 grams of 2-ethoxytetrahydropyran, cooled to a temperature of —10° C., there were added 20.3 ml. of a 32 percent solution of boron trifluoride in diethyl ether. Eighty-seven grams of ketene were then bubbled into the solution at a rate of 17.4 grams per hour, while maintaining the reaction mixture at a temperature between —9° C. and +1° C.

Upon the complete addition of ketene, the acidic catalyst was neutralized by the addition of aqueous sodium acetate and the crude reaction product diluted further with 1100 cc. of diisopropyl ether. The organic layer thereby formed was separated and extracted with water to remove the inorganic salts present. The amount of ketene absorbed during the reaction was found to be 71 grams. The organic product was then stripped of water and diisopropyl ether, after which 231 grams of unreacted 2-ethoxy tetrahydropyran was removed by distillation at a temperature of 185° C., under 2 mm. of mercury pressure. The residual product, a polymeric ester composition, was recovered in a 285-gram yield as a viscous, light-yellow oil and had the following properties: saponification equivalent: 174 (theory: 172); viscosity at a temperature of 100° C.: 1492 centistokes; average molecular weight: 1600; elemental analysis in percent by weight:

indicating a recurring unit structure for the polymeric ester composition represented by the general formula:

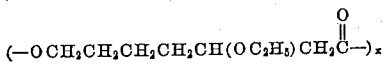

wherein $x$ has an average value of 9.3 as calculated from the determination of average molecular weight.

*Example 2*

A mixture consisting of 325 grams of a polymeric ester composition formed of recurring units represented by the general formula:

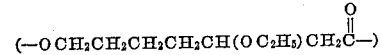

106 grams of sodium hydroxide, 212 ml. of water and 30.6 grams of Raney nickel, and contained in a 3-liter stainless-steel hydrogenation autoclave, was hydrogenated by reaction with hydrogen at a temperature of 155° C., under a hydrogen pressure of between 1600 p.s.i.g. to 1700 p.s.i.g., for a period of four hours. The polymeric ester composition employed in the reaction had been produced by the reaction of 2-ethoxytetrahydropyran and ketene essentially as described above in Example 1. The hydrogenation was discontinued approximately one hour after hydrogen absorption had ceased, as evidenced by the attainment of constant pressure within the autoclave. Upon completion of the reaction period, the viscous reaction mixture was diluted with 500 ml. of water, filtered to remove the Raney nickel and heated to a temperature of 100° C., whereby approximately 58 grams of ethanol were removed. The residual solution was acidified by the addition of 132.8 grams of concentrated sulfuric acid and extracted with two 250 ml. portions of diethyl ether. The ether extracts were combined and dried over anhydrous sodium sulfate. A major portion of the diethyl ether was then removed by distillation under atmospheric pressure, and the final traces of ether removed at reduced temperature and pressure. The residual product, crude 7-hydroxyheptanoic acid, was thus obtained in a 242 gram yield as a viscous, colorless oil, and had a neutralization equivalent of 160.2 (theoretical: 146).

A solution containing essentially all of the 242-grams 7-hydroxyheptanoic acid product described above, 762 grams of ethanol, 5.0 grams of concentrated sulfuric acid and 200 ml. of diisopropyl ether was refluxed at a temperature of 78° C., while removing the water of esterification as an azeotropic mixture with diisopropyl ether. Upon completion of the reaction, as indicated by a cessation of water formation, the acidic catalyst was neutralized by the addition of a solution containing 2.3 grams of sodium in 100 ml. of anhydrous ethanol and filtered to remove the insoluble salts that were present. The ethanol and diisopropyl ether were then removed by distillation and the residue product again dissolved in 200 ml. of diisopropyl ethers. The solution was washed with two 100 ml. portions of water and distilled to remove the diisopropyl ether and remaining traces of water. The crude reaction product was subjected to fractional distillation. At a vapor temperature of from 108° C. to 110° C., under from 1.0 to 1.5 mm. of mercury pressure, 135 grams of ethyl 7-hydroxyheptanoate were collected, representing a 43.1 percent yield based upon the weight of the polymeric ester composition. The product was recovered as a sweet-smelling colorless oil and had the following properties: saponification equivalent: 174 (theoretical: 174); molecular weight, as determined by hydroxyl analysis: 173 (theoretical: 174); index of refraction $n_D^{20}$: 1.4396; elemental analysis in percent by weight:

|   | Found | Calculated for $(C_9H_{16}O_3)_x$ |
|---|---|---|
| C | 62.8 | 62.7 |
| H | 9.4 | 9.4 |

|   | Found | Calculated for $C_9H_{18}O_3$ |
|---|---|---|
| C | 62.27 | 62.0 |
| H | 10.53 | 10.6 |

Example 3

A mixture consisting of 344 grams of a polymeric ester composition formed of recurring units represented by the general formula:

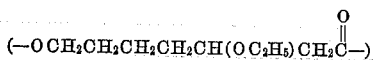

920 grams of ethanol, 4.28 grams of sodium metal and 63.4 grams of Raney nickel, and contained in a stainless-steel autoclave, was hydrogenated by reaction with hydrogen at a temperature of 200° C., under a hydrogen pressure of between 1600 p.s.i.g. and 1700 p.s.i.g., for a period of 5.5 hours. The polymeric ester composition employed in the reaction had been produced by the reaction of 2-ethoxytetrahydropyran and ketene essentially as described above in Example 1. The hydrogenation was discontinued approximately one hour after hydrogen adsorption had ceased, as evidenced by the attainment of constant pressure within the autoclave. Upon completion of the reaction period, the crude reaction product was filtered to remove the Raney nickel and distilled at a temperature of 50° C., under a pressure of 500 mm. of mercury, whereby approximately 918 grams of ethanol were removed. The residual solution was diluted with 500 ml. of diethyl ether and the basic catalyst neutralized by the addition of 9 grams of concentrated sulfuric acid. The resulting organic layer was separated, washed with water to remove any remaining mineral acid, dried over sodium sulfate and subjected to fractional distillation. At a vapor temperature of from 101° C. to 105° C., under 0.7 mm. of mercury pressure, 179 grams of ethyl 7-hydroxyheptanoate were collected, representing a 52 percent yield based upon the weight of the polymeric ester composition. The product was recovered as a water-clear liquid and had a saponification equivalent of 175 (theoretical: 174.2).

Example 4

To 1297 grams (9 mols) of 2-ethoxy-4-methyltetrahydropyran, cooled to a temperature of −10° C., there were added 40 ml. of a 32 percent solution of boron trifluoride in diethyl ether. Two hundred and thirty-seven grams (5.6 mols) of ketene were then bubbled into the solution during a period of 2.5 hours, while maintaining the reaction mixture at a temperature between −10° C. and −3° C. Upon the complete addition of ketene, the acidic catalyst was neutralized by the addition of a solution containing 50 grams of sodium acetate in 300 ml. of water, and the resulting solution agitated for a period of one hour. The amount of ketene absorbed during the reaction was found to be 202.5 grams (4.8 mols). The crude reaction product was stripped of diethyl ether and 245 grams (1.7 mols) of unreacted 2-ethoxy-4-methyltetrahydropyran by steam distillation. The residual product was dissolved in one liter of diisopropyl ether and resulting solution extracted with water several times for the complete removal of the inorganic salts present. Upon stripping diisopropyl ether from the extracted solution and subsequently removing certain neutral, nonsaponifiable, low-boiling side-products by distillation at a temperature of from 60° C. to 107° C., under 3 mm. of mercury pressure, a polymeric ester composition was recovered in a 669-gram yield as a viscous, light-yellow oil and had the following properties: saponification equivalent: 183.7 (theory: 186.2); average molecular weight (Menzies-Wright): 1370; viscosity at a temperature of 100° C.: 950 centistokes; elemental analysis in percent by weight:

|   | Found | Calculated for $(C_{10}H_{18}O_3)_x$ |
|---|---|---|
| C | 64.4 | 64.4 |
| H | 10.2 | 9.8 | indicating a recurring unit structure for the polymeric ester composition represented by the formula:

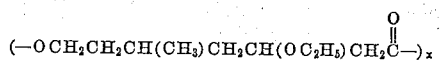

wherein $x$ has an average value of 7.4 as calculated from the determination of average molecular weight.

Example 5

A mixture consisting of 920 grams of a polymeric ester composition formed of recurring units represented by the general formula:

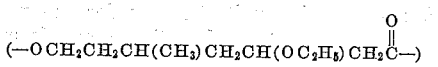

2300 grams of ethanol, 10.9 grams of sodium metal and 80 grams of Raney nickel, contained in a stainless-steel autoclave, was hydrogenated by reaction with hydrogen at a temperature of 200° C., under a hydrogen pressure of between 1750 p.s.i.g. and 1800 p.s.i.g., for a period for 4 hours. The polymeric ester composition employed in the reaction had been produced by the reaction of 2-ethoxy-4-methyltetrahydropyran and ketene essentially as described above in Example 4. The hydrogenation was discontinued when hydrogen absorption ceased, as evidenced by the attainment of constant pressure within the autoclave. Upon completion of the reaction period, the crude reaction product was filtered to remove the Raney nickel and distilled at a temperature of 50° C., under a pressure of 500 mm. of mercury, whereby approximately 1140 grams of ethanol were removed. The residual solution was diluted with 500 ml. of diethyl ether and the basic catalyst neutralized by the addition of 46.4 grams of a 25 percent aqueous solution of sulfuric acid. The resulting organic layer was separated, washed with water, dried over sodium sulfate and subjected to fractional distillation. At a vapor temperature of from 106° C. to 108° C., under 1 mm. of mercury pressure, 242 grams of ethyl 5-methyl-7-hydroxyheptanoate were collected, representing a 26 percent yield based upon the weight of the polymeric ester composition. The product was recovered as a water-clear liquid and had the following properties: saponification equivalent: 192 (theoretical: 188); molecular weight as determined by hydroxyl analysis: 189 (theoretical: 188; elemental analysis percent by weight:

|   | Found | Calculated for $C_{10}H_{20}O_3$ |
|---|---|---|
| C | 63.6 | 63.8 |
| H | 10.8 | 10.6 |

Example 6

To 858.5 grams (4.25 mols) of 2-ethoxy-6-carbethoxy-tetrahydropyran, cooled to a temperature of −10° C., there were added 13.4 ml. of a 32 percent solution of boron trifluoride in diethyl ether. Eighty-one and one-half grams (1.94 mol) of ketene were then bubbled into the solution during a period of one hour, while maintaining the reaction mixture at a temperature between −10° C. and +10° C. Upon the complete addition of ketene, the acidic catalyst was neutralized by the addition of aqueous sodium acetate. The amount of ketene absorbed during the reaction was found to be 68 grams (1.6 mols). The crude reaction product was diluted with one liter of diisopropyl ether. The organic layer thereby formed was separated and extracted with water to remove the inorganic salts present. The organic product was then stripped of water and diisopropyl ether, after which 510 grams (2.5 mols) of unreacted 2-ethoxy-6-carbethoxy-tetrahydropyran was removed by distillation at a temperature of 180° C., under 0.5 mm. of mercury pressure. The residual product, a polymeric ester composition, was recovered as a viscous, light-yellow liquid and had the following properties: saponification equivalent: 124.7 (theory: 122); viscosity at a temperature of 100° C.: 1453 centistokes; average molecular weight: 1740; elemental analysis in percent by weight:

|   | Found | Calculated for $(C_{12}H_{20}O_5)_x$ |
|---|---|---|
| C | 59.1 | 59.0 |
| H | 8.4 | 8.3 | indicating a recurring unit structure for the polymeric ester composition represented by the general formula:

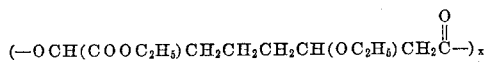

wherein $x$ has an average value of 7.1 as calculated from the determination of average molecular weight.

*Example 7*

A mixture consisting of 900 grams of a polymeric ester composition formed of recurring units represented by the general formula:

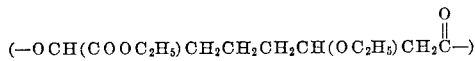

412 grams of sodium hydroxide, 1432 ml. of water and 123 grams of Raney nickel, contained in a stainless-steel autoclave, was hydrogenated by reaction with hydrogen at a temperature of 150° C., under a hydrogen pressure of 1800 p.s.i.g., for a period of 8 hours. The polymeric ester composition employed in the reaction had been produced by the reaction of 2-ethoxy-6-carbethoxytetrahydropyran and ketene essentially as described above in Example 6. The hydrogenation was discontinued when hydrogen absorption ceased, as evidenced by the attainment of constant pressure within the autoclave. Upon completion of the reaction, the reaction mixture was filtered to remove the Raney nickel and distilled at a temperature of 50° C., under a pressure of 500 mm. of mercury, whereby approximately 190.3 grams of ethanol were removed as an azeotropic water-ethanol mixture. The residual solution was acidified by the addition of 515 grams of concentrated sulfuric acid and extracted with three 300 ml. portions of methyl isobutyl ketone. The methyl isobutyl ketone was removed by distillation under a pressure of 50 mm. of mercury, whereupon crude 2-hydroxyoctanedioic acid was obtained in a 673-gram yield as a viscous, pale-yellow residue. A 5-gram sample of the crude acid was dissolved in warm diethyl ether. Upon cooling the solution, the acid separated out as white crystals having the following properties: melting point: 110° C., neutralization equivalent: 95 (theoretical: 94).

A solution containing essentially all of the 673-gram 2-hydroxysuberic acid product described above, 684 grams of ethanol, 6.8 grams of concentrated sulfuric acid and 200 ml. of diisopropyl ether was refluxed at a temperature of 78° C., while removing the water of esterification as an azeotropic mixture with diisopropyl ether. Upon completion of the reaction, as indicated by a cessation of water formation, the acid catalyst was neutralized by the addition of 6.2 grams of an alcoholic sodium ethoxide solution. The crude reaction product was then subjected to fractional distillation. At a vapor temperature of 137° C., under 1 mm. of mercury pressure, 271 grams of diethyl 2-hydroxyoctanedioate were collected, representing a yield of 29.5 percent based upon the weight of the polymeric ester composition. The product was recovered as a colorless oil and, upon redistillation at a temperature of 137° C., under 1 mm. of mercury pressure, exhibited the following properties: saponification equivalent: 1240 (theoretical: 123.2); molecular weight, as determined by hydroxyl analysis: 253 (theoretical: 246.4); index of refraction $n_D^{20}$: 1.4435; elemental analysis in percent by weight:

|   | Found | Calculated for $C_{12}H_{22}O_5$ |
|---|---|---|
| C | 58.6 | 58.5 |
| H | 9.2 | 9.0 |

The invention is susceptible of modification within the scope of the appended claims.

What is claimed is:

1. A process for producing hydroxy-substituted saturated aliphatic carboxylic acids represented by the general formula:

wherein $R^1$ to $R^8$ designate members of the class consisting of hydrogen and the lower alkyl radicals and Y designates a member of the class consisting of hydrogen, the lower alkyl radicals, and the carboxy radical, which process comprises admixing an alkaline saponification agent and a catalytic amount of a hydrogenation catalyst with a polymeric ester composition produced by condensing, at a temperature of from about —80° C. to about 100° C., in the presence of a catalytic amount of an acidic catalyst, ketene and a heterocyclic compound represented by the general formula:

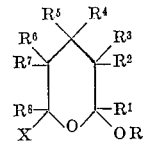

wherein R designates an alkyl radical containing from 1 to about 18 carbon atoms, $R^1$ to $R^8$, are as defined above and X designates a member of the class consisting of hydrogen, the lower alkyl radicals and the carbalkoxy radicals containing from 2 to about 9 carbon atoms; hydrogenating the resultant mixture at a temperature of from about 125° C. to about 175° C., under a hydrogen pressure of from about 150 p.s.i.g. to about 2500 p.s.i.g.; acidifying the alkaline hydrogenated mixture; and subsequently recovering the hydroxy-substituted saturated aliphatic carboxylic acid product thereby formed.

2. A process for producing hydroxy-substituted saturated aliphatic carboxylic acids represented by the general formula:

wherein $R^1$ to $R^8$ designate members of the class consisting of hydrogen and the lower alkyl radicals and Y designates a member of the class consisting of hydrogen and the lower alkyl radicals, which process comprises admixing an alkaline saponification agent and a catalytic amount of a hydrogenation catalyst with a polymeric ester composition produced by condensing, at a temperature of from about —80° C. to about 100° C., in the presence of a catalytic amount of an acidic catalyst, ketene, and a heterocyclic compound represented by the general formula

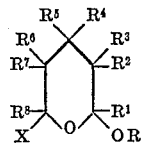

wherein R designates an alkyl radical containing from 1 to about 18 carbon atoms, $R^1$ to $R^8$, are as defined above the X designates a member of the class consisting of hydrogen and the lower alkyl radicals; hydrogenating the resultant mixture at a temperature of from about 135° C. to about 165° C., under a hydrogen pressure of from about 500 p.s.i.g. to about 1800 p.s.i.g.; acidifying the alkaline hydrogenated mixture; and subsequently recovering the hydroxy-substituted saturated aliphatic carboxylic acid product thereby formed.

3. The process according to claim 2 wherein the alkaline saponification agent is an aqueous alkali metal hydroxide solution and the hydrogenation catalyst is Raney nickel.

4. A process for producing hydroxy-substituted saturated aliphatic carboxylic acids represented by the general formula:

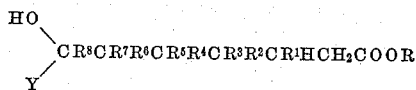

wherein $R^1$ to $R^8$ designate members of the class consisting of hydrogen and the lower alkyl radicals and Y designates a carboxy radical, which process comprises admixing an alkaline saponification agent and catalytic amounts of a hydrogenation catalyst with a polymeric ester composition produced by condensing, at a temperature of from about —80° C. and about 100° C., in the presence of a catalytic amount of an acidic catalyst, ketene and a heterocyclic compound represented by the general formula:

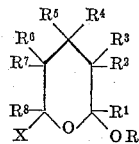

wherein R designates an alkyl radical containing from 1 to about 18 carbon atoms, $R^1$ to $R^8$, are as defined above and X designates a carbalkoxy radical containing from 2 to about 9 carbon atoms; hydrogenating the resultant mixture at a temperature of from about 135° C. to about 165° C., under a hydrogen pressure of between about 500 p.s.i.g. and about 1800 p.s.i.g.; acidifying the alkaline hydrogenated mixture; and subsequently recovering the hydroxy-substituted saturated aliphatic carboxylic acid product thereby formed.

5. The process according to claim 4 wherein the alkaline saponification agent is an aqueous alkali metal hydroxide solution and the hydrogenation catalyst is Raney nickel.

6. A process for producing hydroxy-substituted saturated aliphatic carboxylic acid esters represented by the general formula:

wherein $R^1$ to $R^8$ designate members of the class consisting of hydrogen and the lower alkyl radicals, $R^9$ designates an alkyl radical containing from 1 to about 18 carbon atoms and Y designates a member of the class consisting of hydrogen, the lower alkyl radicals and the carbalkoxy radicals containing from 2 to about 19 carbon atoms, which process comprises admixing an alkyl alcohol containing from 1 to about 18 carbon atoms and catalytic amounts of both a basic transesterification catalyst and a hydrogenation catalyst with a polymeric ester composition produced by condensing, at a temperature of from about —80° C. to about 100° C., in the presence of a catalytic amount of an acidic catalyst, ketene and a heterocyclic compound represented by the general formula:

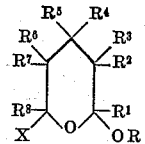

wherein R designates an alkyl radical containing from 1 to about 18 carbon atoms, $R^1$ to $R^8$ are as defined above, and X designates a member of the class consisting of hydrogen, the lower alkyl radicals and the carbalkoxy radicals containing from 2 to about 9 carbon atoms; hydrogenating the resultant mixture at a temperature of from about 150° C. to about 200° C., under a hydrogen pressure of from about 150 p.s.i.g. to about 2500 p.s.i.g.; and subsequently recovering the hydroxy-substituted carboxylic acid ester thereby formed.

7. A process for producing hydroxy-substituted saturated aliphatic carboxylic acid esters represented by the general formula:

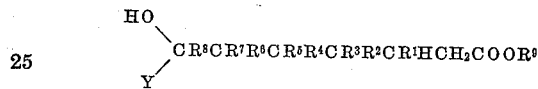

wherein $R^1$ to $R^8$ designate members of the class consisting of hydrogen and the lower alkyl radicals, $R^9$ designates an alkyl radical containing from 1 to about 18 carbon atoms and Y designates a member of the class consisting of hydrogen and the lower alkyl radicals, which process comprises admixing an alkyl alcohol containing from 1 to about 18 carbon atoms and catalytic amounts of both a basic transesterification catalyst and a hydrogenation catalyst with a polymeric ester composition produced by condensing, at a temperature of from about —80° C. to about 100° C., in the presence of a catalytic amount of an acidic catalyst, ketene and a heterocyclic compound represented by the general formula:

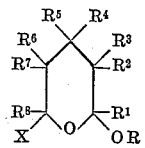

wherein R designates an alkyl radical containing from 1 to about 18 carbon atoms, $R^1$ to $R^8$ are as defined above, and X designates a member of the class consisting of hydrogen and the lower alkyl radicals; hydrogenating the resultant mixture at a temperature of from about 175° C. to about 200° C., under a hydrogen pressure of from about 500 p.s.i.g. to about 1800 p.s.i.g.; and subsequently recovering the hydroxy-substituted carboxylic acid ester thereby formed.

8. The process according to claim 7 wherein the basic transesterification catalyst is an alkali metal alkoxide and the hydrogenation catalyst is Raney nickel.

9. A process for producing hydroxy-substituted saturated aliphatic carboxylic acid esters represented by the general formula:

wherein $R^1$ to $R^8$ designate members of the class consisting of hydrogen and the lower alkyl radicals, $R^9$ designates an alkyl radical containing from 1 to about 18 carbon atoms and Y designates a carbalkoxy radical containing from 2 to about 19 carbon atoms, which process comprises admixing an alkyl alcohol containing from 1 to about 18 carbon atoms and catalytic amounts of both a basic transesterification catalyst and a hydrogenation catalyst with a polymeric ester composition produced by condensing, at a temperature of from about —80° C. to about 100° C., in the presence of a catalytic amount of an acidic catalyst, ketene and a heterocyclic compound represented by the general formula:

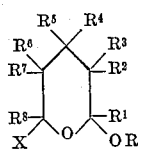

wherein R designates an alkyl radical containing from 1 to about 18 carbon atoms, $R^1$ to $R^8$ are as defined above, and X designates a carbalkoxy radical containing from 2 to about 9 carbon atoms; hydrogenating the resultant mixture at a temperature of from about 175° C. to about 200° C., under a hydrogen pressure of from about 500 p.s.i.g. to about 1800 p.s.i.g.; and subsequently recovering the hydroxy-substituted carboxylic acid ester thereby formed.

10. The process according to claim 9 wherein the basic transesterification catalyst is an alkali metal alkoxide and the hydrogenation catalyst is Raney nickel.

11. A process for the production of 7-hydroxyheptanoic acid which comprises admixing an alkaline saponification agent and a catalytic amount of a hydrogenation catalyst with a polymeric ester composition produced by condensing, at a temperature of from about —80° C. to about 100° C., in the presence of a catalytic amount of an acidic catalyst, ketene and 2-ethoxytetrahydropyran; hydrogenating the resultant mixture at a temperature of from about 125° C. to about 175° C., under a hydrogen pressure of from about 150 p.s.i.g. to about 2500 p.s.i.g.; acidifying the alkaline hydrogenated mixture; and subsequently recovering the 7-hydroxyheptanoic acid product thereby formed.

12. A process for the production of 2-hydroxyoctanedioic acid which comprises admixing an alkaline saponification agent and a catalytic amount of a hydrogenation catalyst with a polymeric ester composition produced by condensing, at a temperature of from about —80° C. to about 100° C., in the presence of a catalytic amount of an acidic catalyst, ketene and 2-ethoxy-6-carbethoxytetrahydropyran; hydrogenating the resultant mixture at a temperature of from about 125° C. to about 175° C., under a hydrogen pressure of from about 150 p.s.i.g. to about 2500 p.s.i.g.; acidifying the alkaline hydrogenated mixture; and subsequently recovering the 2-hydroxyoctanedioic acid product thereby formed.

13. A process for the production of ethyl 7-hydroxyheptanoate which comprises admixing ethanol and catalytic amounts of both a basic transesterification catalyst and a hydrogenation catalyst with a polymeric ester composition produced by condensing, at a temperature of from about —80° C. to about 100° C., in the presence of a catalytic amount of an acidic catalyst, ketene and 2-ethoxytetrahydropyran; hydrogenating the resultant mixture at a temperature of from about 150° C. to about 200° C., under a hydrogen pressure of from about 150 p.s.i.g. to about 2500 p.s.i.g.; and subsequently recovering the ethyl 7-hydroxyheptanoate product thereby formed.

14. A process for the production of ethyl 5-methyl-7-hydroxyheptanoate which comprises admixing ethanol and catalytic amounts of both a basic transesterification catalyst and a hydrogenation catalyst with a polymeric ester composition produced by condensing, at a temperature of between about —80° C. and about 100° C., in the presence of a catalytic amount of an acidic catalyst, ketene and 2-ethoxy-4-methyltetrahydropyran; hydrogenating the resultant mixture at a temperature of from about 150° C. to about 200° C., under a hydrogen pressure of from about 150 p.s.i.g. to about 2500 p.s.i.g.; and subsequently recovering the ethyl 5-methyl-7-hydroxyheptanoate product thereby formed.

15. A process for the production of diethyl 2-hydroxysuberate which comprises admixing ethanol and catalytic amounts of both a basic transesterification catalyst and a hydrogenation catalyst with a polymeric ester composition produced by condensing, at a temperature of from about —80° C. to about 100° C., in the presence of a catalytic amount of an acidic catalyst, ketene and 2-ethoxy-6-carbethoxytetrahydropyran; hydrogenating the resultant mixture at a temperature of from about 150° C. to about 200° C., under a hydrogen pressure of from about 150 p.s.i.g. to about 2500 p.s.i.g., and subsequently recovering the diethyl 2-hydroxyoctanedioate product thereby formed.

No references cited.

UNITED STATES PATENT OFFICE
CERTIFICATION OF CORRECTION

Patent No. 2,998,446								August 29, 1961

Amelio E. Montagna et al.

It is hereby certified that error appears in the above numbered patent requiring correction and that the said Letters Patent should read as corrected below.

Column 3, line 39, for "where" read -- wherein --; line 40, for "carbbox" read -- carboxy --; column 10, line 19, for "for", second occurrence, read -- of --; line 44, after "188" insert a closing parenthesis.

Signed and sealed this 24th day of April 1962.

(SEAL)
Attest:

ESTON G. JOHNSON
Attesting Officer

DAVID L. LADD
Commissioner of Patents